H. M. PLAISTED.
AIR SKIMMER FOR BELT PULLEYS.
APPLICATION FILED AUG. 25, 1919.
1,375,173.
Patented Apr. 19, 1921.
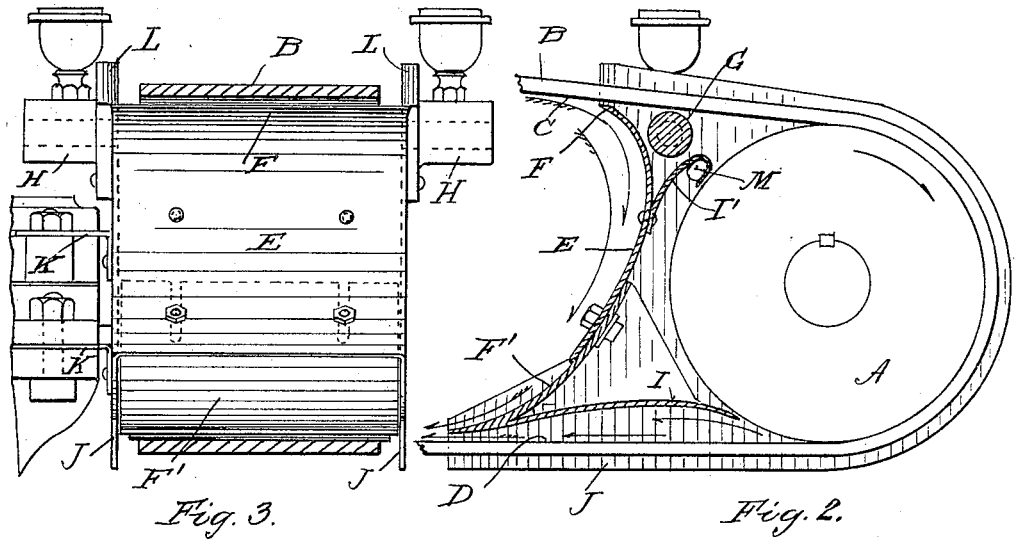
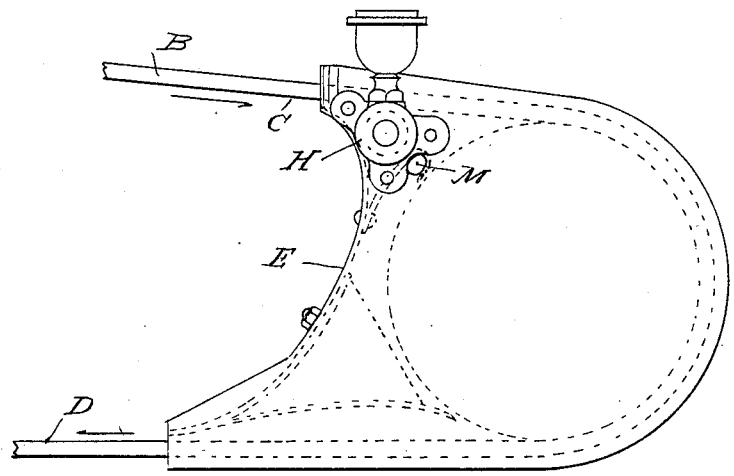
Inventor
Harold M. Plaisted.

UNITED STATES PATENT OFFICE.

HAROLD M. PLAISTED, OF ST. LOUIS, MISSOURI, ASSIGNOR OF FORTY-NINE ONE-HUNDREDTHS TO MILTON F. WILLIAMS, OF ST. LOUIS, MISSOURI.

AIR-SKIMMER FOR BELT-PULLEYS.

1,375,173.   Specification of Letters Patent.   Patented Apr. 19, 1921.

Application filed August 25, 1919. Serial No. 319,525.

*To all whom it may concern:*

Be it known that I, HAROLD M. PLAISTED, a citizen of the United States, residing at St. Louis, State of Missouri, have invented certain new and useful Improvements in Air-Skimmers for Belt-Pulleys, of which the following is a specification.

This invention relates to certain new and useful improvements in air skimmers for belt pulleys, the peculiarities of which will be hereinafter fully described and claimed.

The main object of my invention is the provision of means for deflecting a large proportion of the air ordinarily drawn in between a belt and the pulley over which it runs, so as to improve the adhesion of the belt on the pulley; secondly, to deflect much of the residual air from the pulley itself and avoid carrying it again around under the belt. As is well known, the air adhering to the under side or inside of a belt running over a pulley is carried around and cushions the belt so that it reduces the adhesion of the belt upon the pulley. In high speed pulleys and fast traveling belts, this cushioning effect is very perceptible in the reduced efficiency of the belt, and is visible in many cases so that the eye can perceive light between the belt and the pulley. Various styles of pulley have been designed for letting out this cushioned air, but my device aims to deflect the air from the inside face of a belt, just previous to the engagement of said belt with the pulley; it also aims to deflect from the pulley itself, air necessarily in contact with the pulley face between the approaching and receding portions of the belt and further promote the adhesion of said belt and pulley.

In the accompanying drawing on which like reference letters indicate corresponding parts, Figure 1 represents a side view of my device applied to a belt and pulley; Fig. 2, a longitudinal section of the device showing the edge of the belt and side of the pulley; and Fig. 3, a cross section of the belt and a face view of a curved skimming plate interposed between approaching and receding portions of the belt and adjacent to the pulley.

The letter A designates a pulley of the ordinary or any suitable construction or design, over which runs a belt B. The letter C indicates the inside face of said belt approaching the pulley, and the letter D represents the inside face receding from the pulley. Between these two faces or portions of the belt and adjacent to the pulley, is located a plate E, the upper curved edge F of which plate is located in close proximity to the inner face of the approaching belt, so that the belt is practically tangent to the curve of the plate,—which curve diverges from the belt as shown in Fig. 2. The air adhering to the inside face of the belt and carried along with it toward the pulley, is skimmed off by the curved edge F and deflected from the pulley as indicated in Fig. 2.

As it is desirable to have the edge F in close proximity to the inner face of the belt without danger of contact therewith, a guard roller G is rotatably mounted in suitable bearings H—H and in similar proximity to said inner face, so that sagging of the belt will cause it to engage the guard roller and avoid engagement with the edge F.

The said plate E is provided with an extension F', preferably curved in the opposite direction to the other edge F, and located adjacent to the receding belt face D and in close proximity thereto as shown in Fig. 2. This extension F' is adjustably connected by slot and bolt engagement or otherwise to the plate E, and is preferably provided with a rearward extension I toward the pulley, so that the edge of said extension I will be close to the pulley face and tend to skim from the pulley the residual air passing around between the belt and pulley in the direction of the arrows along the receding face of the belt, and combining with the currents deflected from the extension F' as shown in Fig. 2.

The said plate is preferably supported by sides J—J that extend rearward toward the pulley and form a casing with the belt to inclose said pulley,—said casing having the curved plate E for one face thereof. The casing is provided with lugs K by which it is mounted on an adjacent bearing or otherwise, and the forward edges of the sides are curved outward as shown at L Fig. 3 to prevent engagement with the edges of the approaching portion of the belt.

The air that escapes the extension I is mainly collected by another rearward extension I' located near the face C of the belt and extending backward from the plate E and having its edge in close proximity to the pulley, and adapted to skim off the air from said pulley face and deflect it through an opening M in each side J.

Thus the surplus air on the inner face of the belt and likewise that on the face of the pulley not in contact with the belt is deflected or skimmed off by my device, and the cushioning effect of air between the belt and pulley is practically eliminated. A reduced air pressure within the casing formed by the sides and front of my device, increases the contact of the belt upon the pulley and the resulting efficiency of power transmission.

While I have shown and described a curved plate as a skimmer for belt and pulley, other means for removing or deflecting the air from said surfaces may be employed, as I do not limit myself to the special means shown herewith.

I claim:

1. The combination with a belt and pulley, of an air-skimming plate located adjacent to said pulley and having one air-skimming edge in proximity to the inside of the approaching belt and provided with another air-skimming edge in proximity to the pulley, and adapted to skim the air from the inside of the belt near the pulley and also from the surface of the pulley adjacent to the approaching belt.

2. The combination with a belt and pulley, of a curved plate located adjacent to said pulley and between the approaching and receding portions of the inside face of said belt,—which face is substantially tangent to the ends of the curved plate, substantially as and for the purpose described.

3. The combination with a belt and pulley, of a curved plate located adjacent said pulley,—the approaching inner face of said belt being substantially tangent to one edge of said plate,—and a guard roller mounted adjacent to the inner face of the belt, for avoiding contact of the belt with said edge of the plate substantially as described.

4. The combination with a belt and pulley, of a plate located adjacent to said pulley, and having its edges adjustable with regard to the inner face of said belt, substantially as described.

5. The combination with a belt and pulley, of a curved plate having one edge located adjacent to the inner face of the approaching belt, and another edge adjustably located adjacent to the receding inner face of said belt, and having an extension from the back of the plate ending in proximity to the face of said pulley, substantially as described.

6. A device of the character described, comprising a curved plate extensible in length, having rearward parallel sides and rearward extensions between said sides, adapted to fit between the approaching and receding portions of the inner face of a belt, and inclose a pulley carrying said belt, respectively, substantially as described.

In testimony whereof I have affixed my signature.

HAROLD M. PLAISTED.